Aug. 12, 1930.  R. W. SWOPE  1,773,016
COTTON CLEANER AND FEEDER
Filed Sept. 9, 1929   2 Sheets-Sheet 1
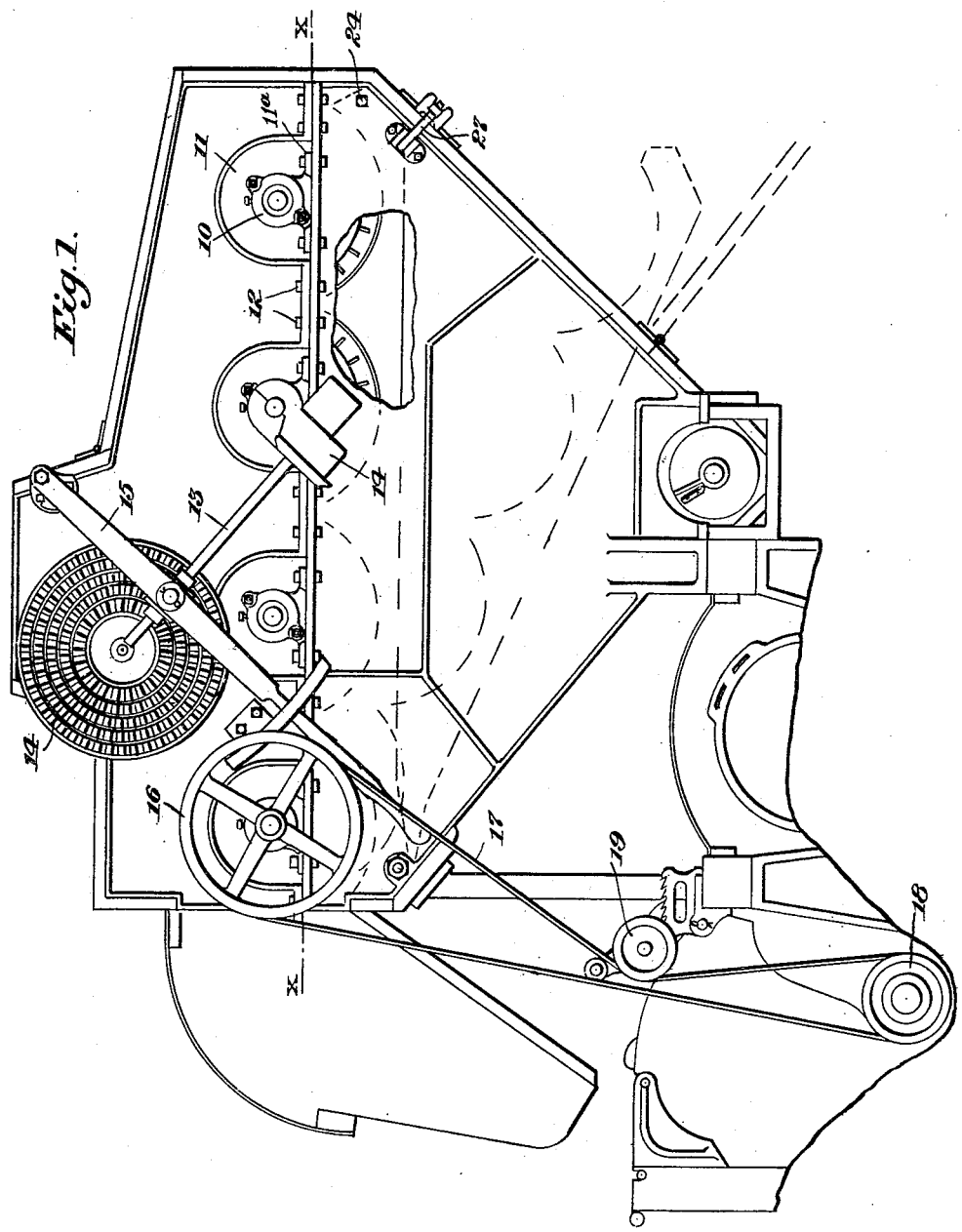

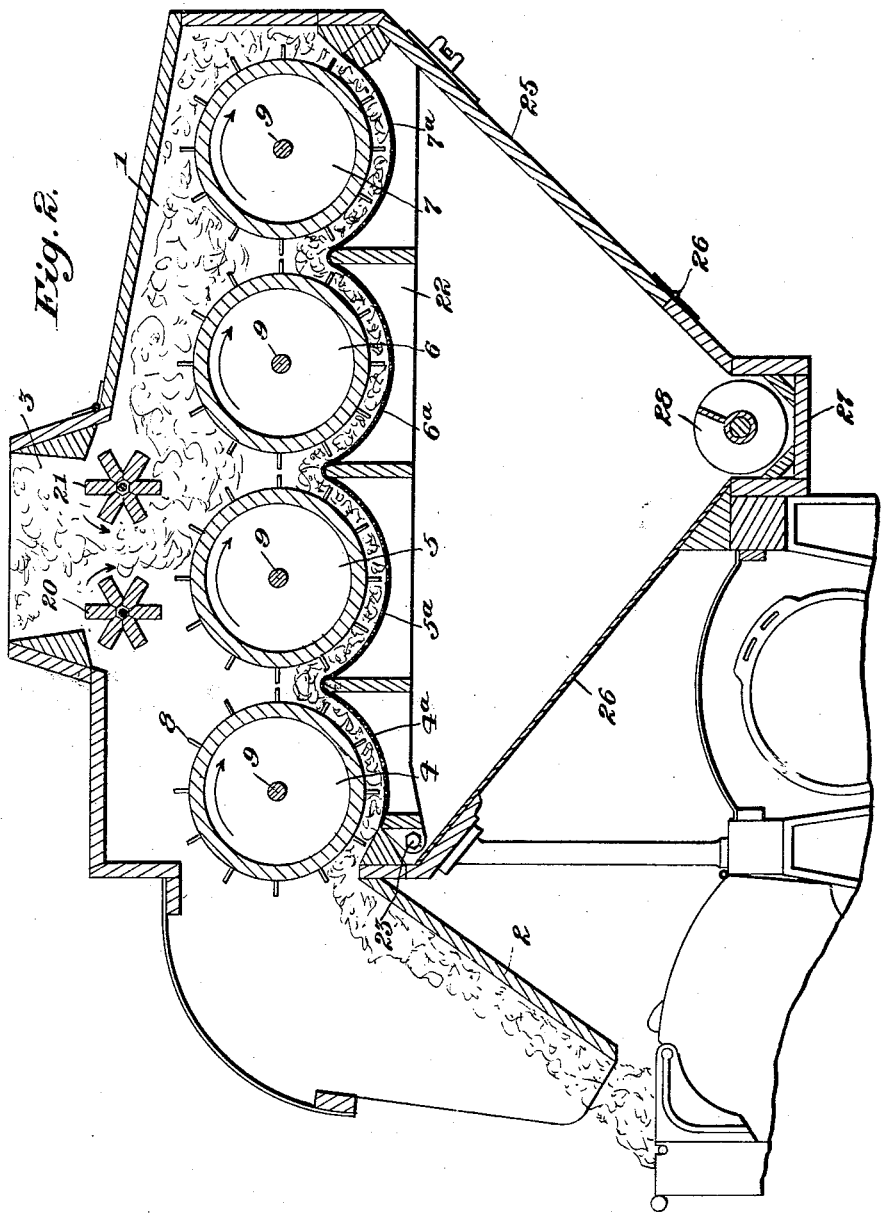

Patented Aug. 12, 1930

1,773,016

UNITED STATES PATENT OFFICE

ROY WALTER SWOPE, OF COLUMBUS, GEORGIA, ASSIGNOR TO CEN-TENNIAL COTTON GIN COMPANY, OF COLUMBUS, GEORGIA, A CORPORATION OF GEORGIA

COTTON CLEANER AND FEEDER

Application filed September 9, 1929. Serial No. 391,222.

The invention relates to new and useful improvements in cotton cleaners and feeders, and more particularly to a cleaner and feeder which not only cleans the cotton but which feeds the same directly to a gin.

An object of the invention is to provide a cotton cleaner and feeder wherein the cotton is passed over a series of picker drums in a circuitous path so that the cotton is effectively cleaned and can be fed directly into the gin.

A further object of the invention is to provide a cleaner and feeder of the above type having screens associated with the picker drums and wherein said screens are mounted so that they may be readily moved away from the picker drums for cleaning.

A still further object of the invention is to provide a cleaner and a feeder of the above type wherein all of the picker drums have their axes mounted in a single horizontal plane and the casing enclosing the same is divided along said plane so that the picker drums may be readily removed when desired.

These and other objects will in part be obvious and will in part be hereinafter more fully disclosed.

In the drawings which show by way of illustration one embodiment of the invention:—

Figure 1 is a side view of a cleaner and feeder embodying the improvements;

Fig. 2 is a vertical sectional view through the same in a plane at right angles to the picker drums.

The invention is directed to a cleaner and a feeder adapted to be used in connection with a cotton gin. The cleaner includes a casing 1 which is adapted to be mounted on the frame of the cotton gin. This casing is provided with a discharge chute 2 which feeds the cotton directly into the cotton gin. The casing is also provided with a hopper 3 into which the cotton is fed. Mounted in the casing, as shown in the drawings, are four picker drums 4, 5, 6 and 7. These drums are all of similar construction and are hollow and provided with projecting spikes 8. Each drum is mounted on a central shaft 9. The shafts 9 of the respective drums are mounted on ball bearings 10 which in turn are supported on rails 11ª formed as a part of the casing. The casing is divided centrally along the line x—x. The bearings are mounted on the lower part of the casing and the upper part of the casing is provided with openings 11 which form a clearance space for the bearings. The two sections of the casing are secured together by suitable bolts 12, 12. When these bolts are released the upper section may be removed from the lower section. This gives ready access to the drums in case of stoppage or when it is desired to remove and replace the drum. Each drum shaft is provided with a gear and these gears intermesh with intermediate gears for the purpose of rotating the drums in the same direction. They are located on the opposite side of the machine from that shown in Fig. 1 and have not been illustrated as they are of the usual well known construction.

The drum shaft 9 of the drum 6 is driven from a shaft 13 through a worm gear connection which is mounted in the housing 14. This housing 14 is secured to the frame or casing of the cleaner independently of the ball bearing which supports the drum so that it can be readily removed. The shaft 13 carries a gear which meshes with the sectional radial gear 14. The gear on the shaft 13 is keyed to the shaft and is free to move endwise thereon. A lever 15 is used for shifting the gear from one section of the driving gear 14 to another for varying the speed of rotation of the picker drums.

The gear 14 is mounted on the main shaft of the machine. As clearly shown in Fig. 1 the shaft of the picker drum 4 is provided with a belt wheel 16. A belt wheel 17 running over this wheel also runs over and operates the belt wheel 18 which is a part of the cotton gin. An idler 19 provides means for keeping the belt 17 under proper tension.

Adjacent the lower end of the hopper 3 are feed rollers 20 and 21 mounted in suitable bearings in the casing or frame 1 and provided with gears which are driven by the gears operating the picker drums. The feed roller 20 is moved in the same direction as the drums and the feed roller 21 is moved in the opposite direction. This enables the cotton to be gripped by the fluted faces of the feed rollers 20 and 21 and fed positively into range of the spikes on the picker drums.

In Fig. 2 I have shown the path of travel of the cotton. It is forcibly passed between the feed rollers 20 and 21 into range of the spikes on the picker drums. It will be carried by the picker drum 5 toward the right as viewed in Fig. 2. The picker drum 6 will take the cotton and feed it along into range of the spikes on the drum 7. The cotton is carried around with the spikes on the drum 7 and across a screen 7ª associated with the drum 7. The spikes on the drum 6 tend to strip the cotton from the spikes on the drum 5, but some of the cotton may be carried down between the drums 5 and 6. The general path of movement of the cotton, however, is across the top of the drum, around the drum 7 and back across the lower side of the drums.

Associated with the drum 6 is a screen 6ª; associated with the drum 5 is a screen 5ª, and associated with the drum 4 is a screen 4ª. These screens are curved to conform to the shaping of the picker drums but are spaced therefrom so as to allow a free movement of the cotton across the screen. The screens are all mounted on a screen frame 22. This screen frame 22 is hinged at 23 to the main casing. It is held in operative position by a bolt 24. When this bolt is released the screen may be readily lowered to the broken line position shown in Fig. 1. The casing 1 is provided with a door 25 hinged at 26 and held in closed position by means of a latch 27. There is a latch at each side of the door. When these latches are released, then the door may be turned to the broken line position in Fig. 1 and this permits the screen when lowered to move downward to a position where it is very accessible for cleaning. The end of the screen projects through the opening formed in the frame and closed by the door 25. When the screen is returned to its operative position and secured in place then the door is closed and the screen is completely housed within the casing. The dirt passing through the screen falling onto the inclined rear wall 26 of the casing and the inclined front wall of which the door 25 is a part will accumulate in a trough 27 and will be fed along the trough by a screw feed 28 and discharged from the end of the trough at one side of the casing. This screw feed is so positioned at the bottom of the casing that the casing may be supported on the cotton gin whereby the cotton as it is discharged from the cleaner will be fed directly into the cotton gin.

As noted, the cotton passes across the top of the drums, then around beneath the drums and across the screens and is discharged into the chute 2 which in turn discharges the cotton into the gin. I have found that by passing the cotton in this circuitous path over a series of picker drums and underneath these picker drums the cotton will be thoroughly cleaned so that it may be passed directly to the cotton gin.

It will be apparent that the picker drums may be readily made accessible by removing the upper section of the casing or frame housing the same. The screen is also readily accessible by opening the door 25 so that it may be cleaned.

The drum shaft 9 of the drum 6 is driven from the shaft 13 as above noted. The drum shafts of the drums 4, 5 and 7 are operated by suitable belt connections with the shaft 9 of the drum 6. The shafts carrying the feed rollers 20 and 21 are driven through suitable gear connections. All of these operating parts are in the opposite side of the machine, and as the driving mechanism forms no part of the present invention it has not been shown in detail.

It is obvious that minor changes in the details of construction and the arrangement of parts may be made without departing from the spirit of the invention as set forth in the appended claims.

Having fully described my invention, what I claim as new and desire to secure by Letters Patent, is:—

1. A cotton cleaner and feeder comprising a casing divided horizontally into upper and lower sections, a series of picker drums mounted on shafts disposed in the same horizontal plane with ball bearings for said shafts mounted on the lower section of the casing whereby said upper section of the casing may be removed to give access to the picker drums.

2. A cotton cleaner and feeder comprising a casing divided horizontally into upper and lower sections, a series of picker drums arranged on shafts with their axes in the same horizontal plane with ball bearings for said shaft mounted on the lower section of the casing whereby said upper section of the casing may be removed to give access to the picker drum, feed rollers for feeding the cotton to said picker drums at a point so that the cotton is carried across the tops of the picker drums, around the end drum and across the lower sides of the picker drums, screens associated with said picker drums at the lower side thereof, said screens being curved to conform to the drums, and a screen frame for supporting said screens.

3. A cotton cleaner and feeder comprising a casing having a receiving opening and a discharge outlet, a series of picker drums arranged with their axes in the same horizontal plane, feed rollers for feeding the cotton to said picker drums at a point so that the cotton is carried across the tops of the picker drums, around the end drum and across the lower sides of the picker drums, screens associated with said picker drums at the lower side thereof, said screens being curved to conform to the drums, a screen frame for supporting said screens, means for pivoting said screen frame at the side of the casing adjacent the outlet, and means for releasably holding the other side of said screen frame so that when released the frame may be lowered away from the picker drums for rendering the screens accessible for cleaning, said casing having an opening and a door for closing the opening for giving access to said screens.

4. A cotton cleaner and feeder comprising a frame divided into upper and lower sections, a series of picker drums, a shaft for each drum, ball bearings for supporting the shafts, means for supporting said ball bearings on the lower section of the casing independently of the upper section so that said upper section may be removed to give access to said picker drums, a guiding shaft, a worm gear mounted on one of the shafts of the picker drums, a spiral gear carried by the driving shaft meshing with the worm gear, a housing for the worm gear and spiral gear, and means for mounting said housing on the lower section of said casing independently of the ball bearings.

In testimony whereof, I affix my signature.

ROY WALTER SWOPE.